US009365357B2

(12) United States Patent
Ghezal

(10) Patent No.: US 9,365,357 B2
(45) Date of Patent: Jun. 14, 2016

(54) CONVEYOR SYSTEM INCLUDING TRACKING OF THE CONVEYED ARTICLES BY USING IMAGING AND VIRTUAL SENSORS

(71) Applicant: SOLYSTIC, Bagneux (FR)

(72) Inventor: Mohammed Ghezal, Tullins (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 14/283,685

(22) Filed: May 21, 2014

(65) Prior Publication Data
US 2015/0041281 A1 Feb. 12, 2015

(30) Foreign Application Priority Data

Aug. 7, 2013 (FR) ...................................... 13 57852

(51) Int. Cl.
G06F 19/00 (2011.01)
B65G 43/00 (2006.01)
B07C 3/14 (2006.01)
G06T 7/00 (2006.01)
G06T 7/20 (2006.01)
G06M 1/10 (2006.01)
G06K 9/00 (2006.01)

(52) U.S. Cl.
CPC . B65G 43/00 (2013.01); B07C 3/14 (2013.01); G06K 9/00201 (2013.01); G06M 1/101 (2013.01); G06T 7/0046 (2013.01); G06T 7/0075 (2013.01); G06T 7/2046 (2013.01); G06T 2207/10012 (2013.01); G06T 2207/20144 (2013.01); G06T 2210/21 (2013.01)

(58) Field of Classification Search
USPC ........................................................ 700/110
See application file for complete search history.

(56) References Cited

U.S. PATENT DOCUMENTS 5,267,654 A * 12/1993 Leverett ........................ 209/538
7,974,725 B2 * 7/2011 Gu ........................ G05B 17/02
 700/110

(Continued)

FOREIGN PATENT DOCUMENTS

EP 2 107 336 A1 10/2009

OTHER PUBLICATIONS

Corinne Saulnier; "Addition Sums—SOSi by Solystic"; Products and Services; Mar. 1, 2011; pp. 1-2.

(Continued)

*Primary Examiner* — Gene Crawford
*Assistant Examiner* — Lester Rushin
(74) *Attorney, Agent, or Firm* — Ware, Fressola, Maguire & Barber LLP

(57) ABSTRACT

A postal sorting machine comprises a conveyor system having a conveyor adapted to move mailpieces along a certain conveyor path along sorting outlets of the sorting machine. The sorting machine includes at least one pass sensor to detect the mailpieces in motion on the conveyor going past at a certain point of the conveyor path and to respond to a detection of the mailpiece by delivering a pass detection signal to a monitoring and control unit which responds to the detection signal by delivering a control signal for an electromechanical actuator of the conveyor. The pass sensor is a virtual sensor. A movement tracking system generates digital images of the mailpieces. An emulator generates 3D-modeled mailpieces and detects interactions between the 3D-modeled mailpieces a 3D model of the conveyor to generate the pass detection signal.

3 Claims, 1 Drawing Sheet

(56) References Cited

U.S. PATENT DOCUMENTS

| | | | |
|---|---|---|---|
| 8,013,261 B2* | 9/2011 | De Leo | 177/1 |
| 2003/0109951 A1* | 6/2003 | Hsiung et al. | 700/108 |
| 2005/0257748 A1* | 11/2005 | Kriesel et al. | 119/51.02 |
| 2009/0089700 A1* | 4/2009 | Gu et al. | 715/771 |

OTHER PUBLICATIONS

"Future Postal Solutions SoSi, Process Engineering, Sizing, Modelling & Simulation"; SoSi by Solystic; Jan. 1, 2011; pp. 1-1.

* cited by examiner

CONVEYOR SYSTEM INCLUDING TRACKING OF THE CONVEYED ARTICLES BY USING IMAGING AND VIRTUAL SENSORS

CROSS REFERENCE TO RELATED APPLICATION

This application claims priority under 35 USC §119 to French Patent Application No. 1357852 filed on Aug. 7, 2013, which application is hereby incorporated by reference in its entirety.

TECHNICAL FIELD

The invention relates to electromechanical conveyor systems, and in particular to a conveyor system including a conveyor suitable for moving articles along a certain conveyor path, at least one pass sensor designed to detect an article in motion on the conveyor going past at a certain point of the conveyor path and to respond to a detection of said article going past by delivering a pass detection signal to a monitoring and control unit via a field-bus, which monitoring and control unit responds to the pass detection signal by delivering a control signal for an electromechanical actuator of the conveyor via said field-bus, which is, for example, a real time field-bus such as a Factory Instrumentation Protocol (FIP) field-bus or an "EtherCAT" field-bus.

PRIOR ART

In known manner, in a postal sorting machine, the sorting conveyor of the belt conveyor type that is suitable for moving the mailpieces in series and on edge by nipping them is provided with a multitude of sensors and actuators.

The sensors comprise pass sensors of the inductive or laser detector type or of the photo detector type that are distributed over the entire conveyor path along which the mailpieces are conveyed on the sorting conveyor, each of which sensors generates a pass detection signal whenever a mailpiece interrupts the beam of the pass sensor.

For example, document EP 2 107 336 mentions pass sensors for monitoring the gaps between articles on a conveyor.

The actuators may be switch flaps, each of which deflects the path of a mailpiece, e.g. towards a sorting outlet of the machine.

The pass sensor signals are sent towards a programmable logic controller in a monitoring and control unit via a field-bus network.

The programmable logic controller responds to receiving the detection signals from the sensors by generating control signals for controlling one or more actuators in the sorting machine. The control signals also go via the field-bus.

Such pass sensors enable the programmable logic controller to monitor the movement of the mailpieces on the sorting conveyor and thus to perform the process of automatically sorting the mailpieces into the sorting outlets of the machine.

The range of mail that is handled automatically in such postal sorting means is tending to become broader, which means that highly different articles can travel on such a sorting conveyor. Thus, manufacturers of such sorting machines are having to modify the sorting conveyors in order to incorporate new sensors or in order to change the locations of the sensors, e.g. so as to make new segregations of mailpieces that give rise to extremely high costs for developing the sorting machines and for testing that they operate properly.

In analogous manner, if additional features, such as measuring the dimensions of the mailpieces or automatically determining the weights of the mailpieces on the basis of such dimension measurements, need to be integrated into an existing postal machine, that gives rise to yet another major modification of the machine.

There therefore exists a need to simplify integrating such sensors into a postal sorting machine and, more generally, into a conveyor of the electromechanical type as indicated above.

To this end, the invention provides a conveyor system comprising a conveyor adapted to move articles along a certain conveyor path, at least one pass sensor designed to detect an article in motion on the conveyor going past at a certain point of the conveyor path and to respond to a detection of said article going past by delivering a pass detection signal to a monitoring and control unit via a field-bus, which monitoring and control unit responds to the pass detection signal by delivering a control signal for an electromechanical actuator of the conveyor via said field-bus, said conveyor system being characterized in that it further comprises a movement tracking system suitable for generating digital images containing the articles in motion in the conveyor, in that said pass sensor is a virtual sensor represented in a three-dimensional (3D) digital model of the conveyor, and in that it includes an emulator configured to transform said images generated by the movement tracking system into 3D-modeled articles and to detect the 3D interactions between the 3D-modeled articles and the virtual sensor represented in the 3D digital model of the conveyor, and on the basis of such detections, to generate said pass detection signals that are delivered to said monitoring and control unit via said field-bus.

The basic idea of the invention is thus to replace the conventional physical pass sensors with an image-taking system while also maintaining the conventional real-time field-bus environment for managing both the detection signals from the sensors and also the control signals for the actuators.

Such virtual sensors may be implemented in the 3D model of the sorting conveyor, e.g. using a computer-aided drawing tool or a simulation tool such as SOLYSTIC's simulation tool "SOSI", which is suitable for modeling the behavior of a sorting machine in 3D with the mailpieces in motion using an approach of the "serious game" type.

It can thus be understood that, in a postal sorting machine with a sorting conveyor of the electromechanical type of the invention, there are no longer any physical sensors per se, but rather there is a programmable emulator that, in their stead, generates detection signals for the monitoring and control unit of the postal sorting machine.

This emulator may be in the form of a programmable data-processing unit that is programmed to transform digital images containing mailpieces in motion in a sorting conveyor and taken by one or more cameras placed above the sorting conveyor into pass detection signals indicating that said mailpieces have been detected going past virtual sensors placed along the conveyor path along which the mailpieces are conveyed.

According to a particular feature of the conveyor system of the invention, the emulator includes a processor and a memory for storing program code, such that when the program code is executed by the processor, blocks of the emulator are realized so as to extract the outline of an article from two-dimensional (2D) digital images containing said article, to transform the outline of an article into a 3D digital model of the article, and to detect intersections firstly of the segments of the 3D representation of the virtual sensor and secondly of the segments of the 3D representation of the mailpiece.

According to another particular feature of the conveyor system of the invention, the tracking system may include a camera placed above the conveyor or a plurality of cameras spaced apart from one another along the conveyor path, thereby making it possible to make the 3D representation of the tracked articles finer.

BRIEF DESCRIPTION OF THE DRAWING

The present invention can be better understood and other advantages appear on reading the following description and on examining the accompanying drawing, in which.

DESCRIPTION OF EMBODIMENTS

Figure 1:
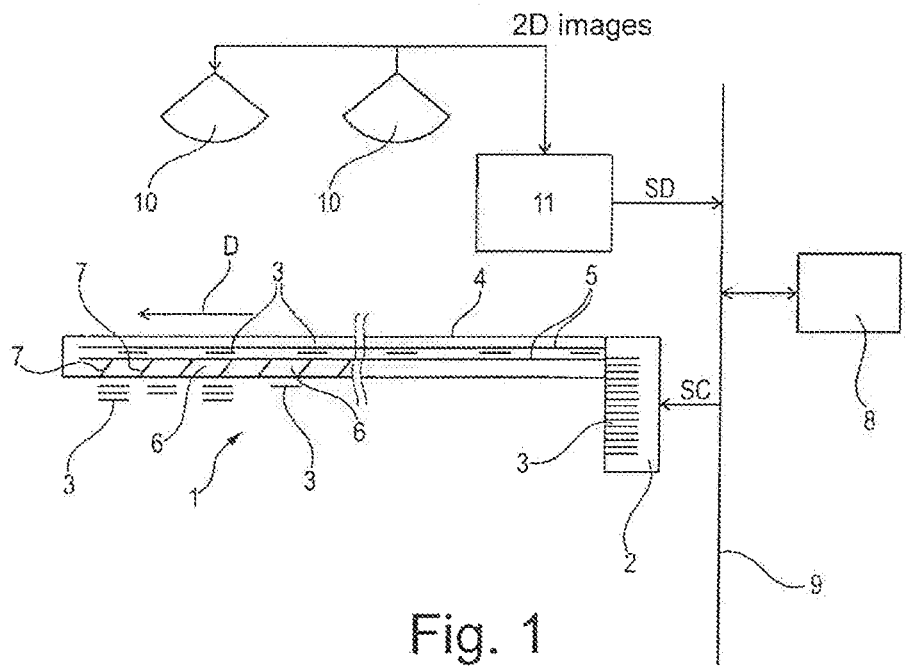
FIG. 1 is a highly diagrammatic view of a postal sorting machine having a tracking system of the invention for tracking the mailpieces by using imaging and virtual sensors.

FIG. 1 shows, by way of example, a mailpiece conveyor system in a postal sorting machine 1, but the invention is applicable to other types of article.

The postal sorting machine includes an unstacker 2 that puts the mailpieces 3 into series in a stack and on edge in the feed magazine of the unstacker.

A sorting conveyor 4 of the electromechanical type, which, in this example, has two belts 5, is disposed downstream from the unstacker 2, and, by nipping them between the belts 5, moves the mailpieces 3 in series and on edge along a conveyor path that extends mainly in the direction D along a plurality of sorting outlets 6 of the machine 1.

In the sorting conveyor 4, a set of electromechanical actuators 7 are shown that are, for example, switching flaps for steering the mailpieces selectively towards the sorting outlets 6 as a function of the delivery address of each mailpiece that is recognized automatically in the sorting machine 1, e.g. by Optical Character Recognition (OCR).

The sorting conveyor 4 is controlled in real time by a programmable logic controller recorded in a monitoring and control unit 8.

The monitoring and control unit 8 is connected to the actuators 7 of the sorting conveyor 4 via a field-bus 9.

The monitoring and control unit 8 generates control signals SC for the actuators 7 as a function of the progress of the mailpiece sorting process and of the relative positions of the mailpieces in the sorting conveyor 4.

In the invention, the mailpieces 3 on the sorting conveyor 4 are tracked by an imaging system that may comprise one or more cameras such as 10, each camera filming the scene above the sorting conveyor that contain the mailpieces 3 in motion on the conveyor.

The 2D digital images formed by each camera 10, e.g. at a video frequency of 25 images per second, are transformed in an emulator 11 of the invention into pass detection signals SD indicating that mailpieces have been detected going past the pass sensors that, in this example, are non-conventional virtual sensors of the inductive sensor type or of some analogous sensor type.

The pass detection signals SD generated by the emulator 11 are sent to the monitoring and control unit 8 via the field-bus 9.

In accordance with the invention, the movement of the mailpieces 3 on the sorting conveyor 4 is thus tracked via virtual sensors that are represented digitally in a 3D digital model of the sorting conveyor.

Such a 3D digital model of the sorting conveyor may be obtained by computer-aided drawing or by some equivalent means.

Figure 2:
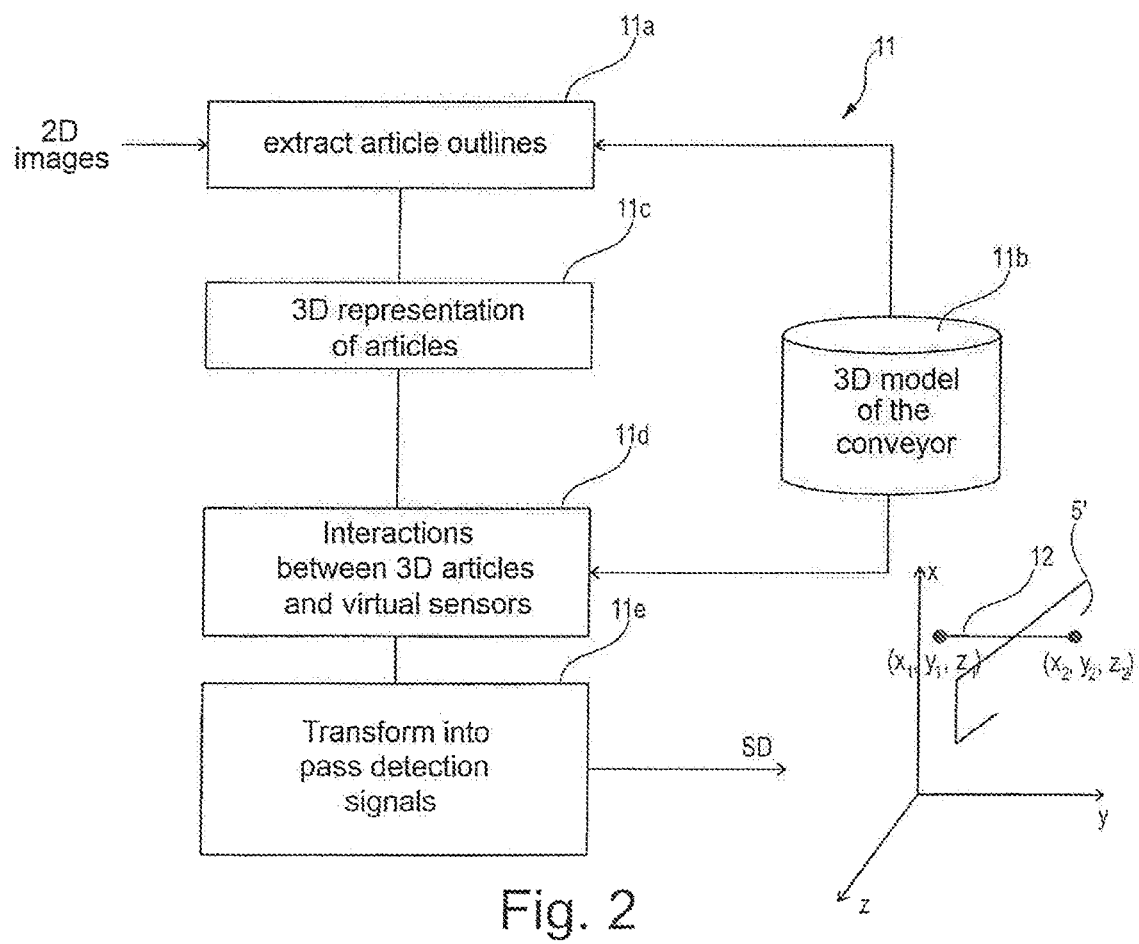
FIG. 2 shows the digital image processing performed by the emulator of the imaging tracking system in order to generate pass detection signals.

For example, the emulator 11 is in the form of a programmable data-processing unit, including a processor and a memory for storing program code, such that when the program code is executed by the processor, the blocks of the emulator as shown in FIG. 2 are realized.

FIG. 2 diagrammatically shows the data-processing blocks in the emulator 11.

The 2D digital images containing one or more mailpieces in motion on the sorting conveyor 4 are firstly processed in an outline extraction module 11a that is suitable for extracting the digital outline of each mailpiece seen from above that is detected in the image.

For dissociating a mailpiece from the scene viewed by a camera 10, the module 11a can use a background image that is pre-recorded in a database 11b and that shows the sorting conveyor 4 seen from above in the absence of any mailpiece 3 on the sorting conveyor 4.

By differentiating between that background image and a current 2D image formed by the camera 10, the module 11b can retrieve only the profile seen from above of the mailpieces contained in the current image.

On the basis of the result of the processing in the module 11a, a module 11c of the emulator reconstructs a 3D representation of the mailpiece(s) present in the current image, e.g. after saturation processing (filling a closed outline) and low-pass filtering that makes it possible to extract the closed digital outline of each mailpiece.

Then, in the module 11c, a 3D representation of each mailpiece is modeled on the basis of said digital outlines extracted from the current images by using description parameters that describe the camera(s) 10.

Said description parameters are recorded in the database 11b. They define, inter alia, the three-dimensional position of each camera 10 relative to the sorting conveyor 4, the viewpoint of the camera, the camera angle, the extent of the angle of view of the camera, and the limits of view of the camera (the "frustum").

In known manner, all these parameters make it possible to obtain a view matrix Mv and a projection matrix Mp, with which matrices it is possible, in the module 11c, to transform the points of the 2D representation of the digital outline of a mailpiece into points of a 3D digital representation of the mailpiece using the following relationship: 2D point=3D point×Mv×Mp.

If the imaging tracking system has a plurality of cameras 10 spaced apart over the conveyor path, the module 11c may be suitable for reconstructing in finer manner the 3D template (with a precise height) for each tracked mailpiece on the sorting conveyor.

In FIG. 2, the 3D model of the conveyor that is recorded in the database 11b is symbolized by a representation 5' of the conveyor belts in a rectangular frame of reference of axes xyz. A virtual pass sensor 12 is also shown in this 3D digital model of the conveyor, this virtual pass sensor being, in this example, represented by a segment disposed at a point of the conveyor path that has its relative three-dimensional position defined by the coordinates (x1,y1,z1) and (x2,y2,z2).

In a module 11d of the emulator, the three-dimensional interactions are then detected between the 3D representations of the mailpieces and the virtual sensors 12 represented in the 3D model of the conveyor that is stored in the database 11b.

The three-dimensional interactions may be identified, for example, by detecting intersections of segments of the virtual sensors and the faces of the grids that constitute the above-indicated 3D models.

In the module 11e of the emulator shown in FIG. 2, the result of the detections of the three-dimensional interactions is transformed into pass detection signals SD indicating detection of mailpieces going past a pass sensor of the sorting conveyor. Each signal SD is adapted by the module 11e so as to go via the field-bus 9 as if it were a signal generated by a physical pass sensor so that the programmable logic controller in the monitoring and control unit 8 is, as it were, fooled by the emulator 11.

With the imaging tracking system of the invention connected via a field-bus to the programmable logic controller of the sorting process, manufacturers of postal sorting machines can more easily change the locations of the mailpiece pass sensors without physically modifying the sorting conveyor.

In addition, the solution of the invention obviates the need for any manual maintenance operations on the sensors along the conveyor, in particular operations for cleaning the sensors so as to remove the dust generated by the mailpieces in motion on the conveyor.

The invention may apply to other types of electromechanical conveyor, e.g. to plate conveyors, transverse carrier belt conveyors, roller conveyors, full-width belt conveyors, or chain conveyors. The invention is also applicable to articles of the parcel or packet type that such other types of conveyor usually convey.

What is claimed is:

1. A postal sorting machine comprising a conveyor system having a conveyor adapted to move mailpieces along a certain conveyor path in a direction D along a plurality of sorting outlets of the postal sorting machine, at least one pass sensor designed to detect at least one of said mailpieces in motion on the conveyor going past at a certain point of the conveyor path and to respond to a detection of said mailpiece going past by delivering a pass detection signal to a monitoring and control unit via a field-bus, which monitoring and control unit responds to the pass detection signal by delivering a control signal for an electromechanical actuator of the conveyor via said field-bus, said postal sorting machine further comprising a movement tracking system suitable for generating digital images containing the mailpieces in motion on the conveyor, wherein said at least one pass sensor is a virtual sensor represented in a 3D digital model of the conveyor, and wherein it includes an emulator configured to transform said images generated by the movement tracking system into 3D-modeled mailpieces and to detect the 3D interactions between the 3D-modeled mailpieces and the virtual sensor represented in the 3D digital model of the conveyor, and on the basis of such detections, to generate said pass detection signals that are delivered to said monitoring and control unit via said field-bus.

2. The postal sorting machine according to claim 1, wherein the emulator is configured to extract the outline of a mailpiece from 2D digital images containing said mailpiece, to transform the outline of said mailpiece into a 3D digital model of the mailpiece, and to detect intersections firstly of segments of the 3D representation of the virtual sensor and secondly of segments of the 3D representation of the mailpiece.

3. The postal sorting machines according to claim 2, wherein the tracking system includes a plurality of digital cameras placed above the conveyor and spaced apart from one another along the conveyor path to produce the digital images of the mailpieces in motion on the conveyor.

* * * * *